United States Patent [19]
Michelson

[11] Patent Number: 5,481,673
[45] Date of Patent: Jan. 2, 1996

[54] METHOD FOR CLUSTER ROUTING IN DIRECT LINK USING TWO ASSOCIATED ROUTING TABLES AT NODE OR SIGNALING TRANSFER POINT

[75] Inventor: Steven M. Michelson, Freehold, N.J.

[73] Assignee: Bell Communications Research Inc., Livingston, N.J.

[21] Appl. No.: 110,147

[22] Filed: Aug. 20, 1993

[51] Int. Cl.⁶ .................. H04J 3/16; H04J 3/24; G06F 13/00
[52] U.S. Cl. ............ 395/200.15; 395/650; 364/242.4; 370/85.1; 370/94.1
[58] Field of Search .................. 395/200, 800; 370/85, 94

[56] References Cited

U.S. PATENT DOCUMENTS

| | | | |
|---|---|---|---|
| 4,742,511 | 5/1988 | Johnson | 370/94 |
| 4,771,424 | 9/1988 | Suzuki et al. | 370/86 |
| 4,780,873 | 10/1988 | Mattheyses | 370/94 |
| 4,875,208 | 10/1989 | Furuhashi et al. | 370/94.1 |
| 5,051,987 | 9/1991 | Conlon | 370/94.1 |
| 5,109,486 | 4/1992 | Seymour | 395/200 |
| 5,125,096 | 7/1992 | Brantley, Jr. et al. | 395/800 |
| 5,128,926 | 7/1992 | Perlman et al. | 370/54 |
| 5,130,977 | 7/1992 | May et al. | 370/60 |
| 5,224,100 | 6/1993 | Lee et al. | 370/94.3 |
| 5,226,039 | 7/1993 | Frank et al. | 370/60 |
| 5,327,427 | 7/1994 | Sandesara | 370/85.14 |

OTHER PUBLICATIONS

Signaling Transfer Point (STP) Generic Requirements Manual, Bellcore, Issue 6, Mar., 1993.
Stored Program Control Switch and Signaling Transfer Point Generic Requirements to Support E–Links, Bellcore Technical Reference, Issue 1, Nov., 1991.
Supplemental End Node Generic Requirements, Bellcore Technical Reference, Issue 1, Jun., 1992.

*Primary Examiner*—Krisna Lim
*Attorney, Agent, or Firm*—Leonard Charles Suchyta; James W. Falk

[57] ABSTRACT

Method and apparatus for cluster routing and management of information from a remote node of a communications network to a network cluster in the presence of at least one direct linkset extending between the remote node and the cluster. The communications network includes a cluster and a plurality of nodes for communicating information to the cluster, which includes a plurality of members. The plurality of nodes includes the remote node and a node adjacent to the cluster in direct communication with the members. The method includes providing a direct linkset between the remote node and at least one of the members of the cluster so that the remote node is directly connected to the cluster, and performing cluster routing of information from the remote node to the members of the cluster not directly connected to the remote node.

6 Claims, 3 Drawing Sheets

METHOD FOR CLUSTER ROUTING IN DIRECT LINK USING TWO ASSOCIATED ROUTING TABLES AT NODE OR SIGNALING TRANSFER POINT

TECHNICAL FIELD

The present invention relates to a method and apparatus for cluster routing and management in a communications network including direct links, such as extended linksets (E-linksets) or fully-associated linksets (F-linksets).

BACKGROUND ART

Figures 1, 2:
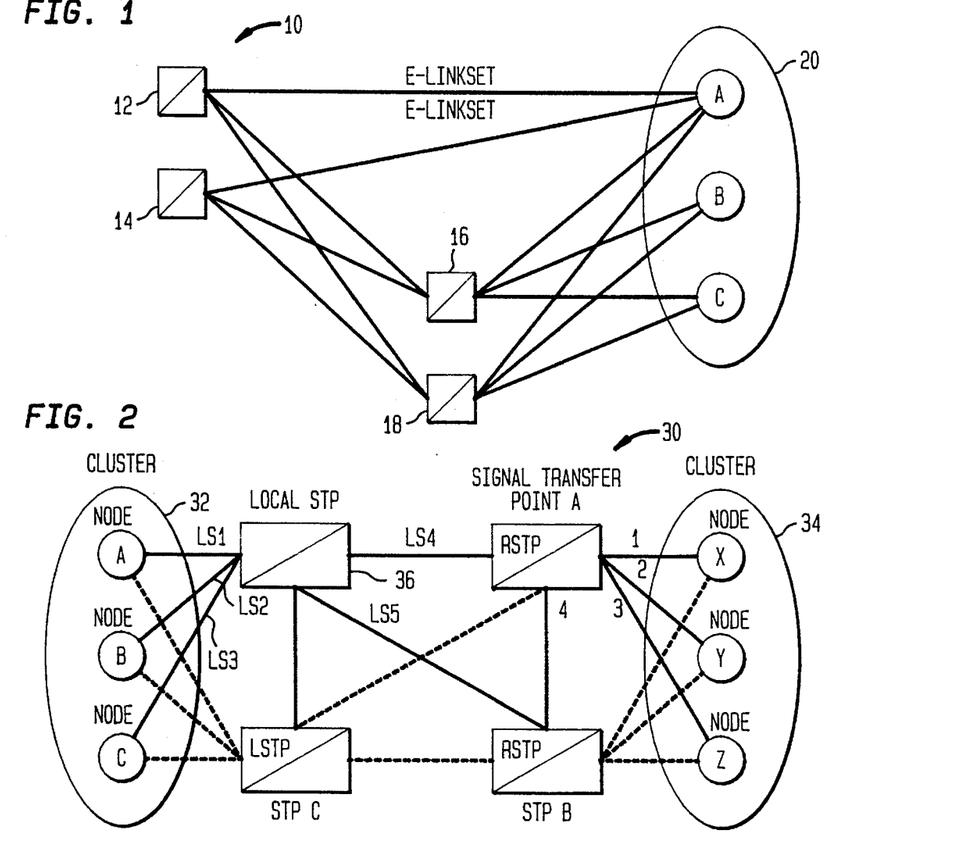
FIG. 1 is an illustration of a communications network including B-links for connecting a plurality of STPs to each other, and A-links for connecting the plurality of STPs to members A-C of a cluster 20, and E-links for connecting STPs 12-14 to member A, for use with the present invention.
FIG. 2 is an illustration of a communications network architecture including a plurality of STP mated pairs interconnected by diagonal links (D-links), and a plurality of cluster members interconnected by access links (A-links)

Cluster routing and management requirements have been developed for all nodes in a Common Channel Signaling (CCS) network, using signaling system number (SS7). Existing cluster routing and management requirements have a limitation which disallows cluster routing from a node to any cluster to which the node has direct links. This limitation is illustrated by FIG. 1, which shows a network 10 including a plurality of signaling transfer points (STPs) 12-18 connected to each other and connected to members A-C of cluster 20.

According to this limitation, if the E-linkset between STP 12 and member A is deployed as shown, STP 12 is unable to perform cluster routing and management to the cluster, whereas if the E-linkset from STP 12 to member A is not deployed, STP 12 can perform cluster routing and management to cluster 20. Thus, even if only one cluster member is connected via an E-linkset to an STP, that STP must perform full point code routing to every member of the cluster. To perform full point code routing, the STP must have a complete route-set administered for each cluster member, which, depending on the implementation, requires the use of additional memory in the STP.

Thus, this limitation restricts the advantages associated with cluster routing and management from a node to cases when direct links (i.e. E-linksets, F-linksets) are not deployed to members of a cluster. It is expected, however, that E-links will be deployed with increasing frequency over the next few years and that cluster routing and management will be desirable in such situations. Therefore, it is necessary to expand the current cluster routing and management requirements to allow cluster routing and management to be performed, even when E-links are deployed utilizing cluster routing and management diversity according to the present invention.

The phrase "cluster routing and management diversity" as used herein refers to the case when a signaling point (SP) is simultaneously performing both cluster and full point code routing and management to members of the same cluster, and where the administered routes may or may not be the same for all members of the cluster. For purposes of this discussion, an SP is any node (i.e. STP, SPCS, etc.), and an end node is anything that is not an STP, such as a Stored Program Control System (SPCS). Cluster routing and management diversity is an extension of previous cluster routing and management requirements, which apply when an SP uses the same routing (i.e., the same route-set) for all members of a cluster, as might be the case when a STP routes messages to remote clusters.

In addition to the "direct link" motivation for developing such requirements, there are additional needs satisfied by the present invention. First, work is currently underway to develop requirements to support a feature in which an SPCS recognizes multiple point codes (PCs) as its own, in support of architectures where different routing would be required for different PCs, even if those PCs are in the same cluster. In that case, cluster routing and management diversity would support cluster routing to the majority of the cluster, and full point code routing to the individual members that require special routing. Second, this feature could be useful in a SPCS that has F-links deployed to another SPCS. This is due to current requirements which indicate that if one SPCS has direct connectivity to another, then both SPCSs perform full point code routing to every member of each other's cluster, which means that a complete route-set must be administered for each cluster member. Finally, there is industry interest in developing a feature that allows cluster routing in the presence of E-links. In order to ensure compatibility between vendor implementations, it is important to establish a common, generic model for this feature.

SUMMARY OF THE INVENTION

It is therefore an object of the present invention to provide a method and apparatus for performing cluster routing and management to a cluster, especially when direct links (e.g. E-linksets, F-linksets) are deployed from a remote node to a member of a cluster.

In carrying out the above object and other objects and features of the present invention, there is provided a method, for use with a communications network including a cluster and a plurality of nodes for communicating information to the cluster, wherein the cluster includes a plurality of members and the plurality of nodes includes a node remote to the cluster and a node adjacent to the cluster directly connected to at least one of the members, for routing information from the remote node to the cluster. The method comprises providing a direct link between the remote node and at least one of the members of the cluster so that the remote node is directly connected to the cluster and performing cluster routing of messages from the remote node to the members of the cluster not directly connected to the remote node.

Apparatus is also provided for carrying out the method.

The goal of defining requirements for cluster routing diversity is to provide the advantages of cluster routing and management, without the limitation that the same routing is used for all members of a cluster. However, to be consistent with the existing requirements that assume that limitation, the following constraints are suggested: consistency with ANSI standards definitions of TCA, TCR and TCP (i.e. TCx) messages; ensuring backward compatibility with current cluster (and full point code) routing and management requirements; providing a flexible way to administer routing data and deploy E-linksets and F-linksets; and providing a generic set of requirements that will allow flexibility in terms of their implementation options.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

For purposes of this discussion, a "cluster" is defined to be a group of SPs having identical Network ID fields and Network Cluster fields in their PCs. The term "route" identifies a link-set in conjunction with a destination; a single link-set may be associated with multiple routes to different destinations. A "normal route" is a route that an SP would select to transmit a message toward a given destination, under normal (i.e. non-failure) conditions whereas an "alternate route" is selected when a normal route can not be used. If multiple alternate routes are discussed, they are referred to as the first and second alternate route, where the first alternate route is of higher priority than the second alternate route. A "route-set" is the term used to identify the prioritized collection of normal and alternate routes that may be used to route messages toward a given destination.

A "destination" is a generic term, and can refer to either a cluster or a member of a cluster. If a route-set is provisioned with the destination being a cluster, it is considered a cluster route-set, and the routes within the route-set are considered cluster routes. If, however, a route-set is provisioned with the destination being a member, it is considered a member route-set, and the routes within the route-set are considered member routes. In either case, a route within a route-set is provisioned with the following pieces of information: the destination, the link-set, and the cost or priority of the route. The current route status is also maintained (on a dynamic basis) for each route in a route-set.

When identifying the route over which a message should be sent, a node may use a full 24-bit Destination Point Code (DPC), examining the Network ID, Network Cluster, and Cluster Member fields, or it may use only the Network ID and Network Cluster portions of the DPC to determine the proper outgoing route. In the former case, the node consults a member route-set, and is performing full point code or member routing; in the latter case, the node consults a cluster route-set, and is performing cluster routing.

Cluster routing and management refers to procedures that use partial point code information (i.e. the Network ID and Network Cluster fields of the DPC present in each SS7 message) to route message signal units (MSUs) and perform network management functions, as well as procedures that determine how to respond to signaling route management messages that refer to clusters or members. Cluster network management messages include transfer-cluster-prohibited [TCP], transfer-cluster-restricted [TCR], transfer-cluster-allowed [TCA], cluster signaling-route-set-test prohibited [RCP], and cluster signaling-route-set-test restricted [RCR] messages. Member network management messages include transfer-prohibited [TFP], transfer-restricted [TFR], transfer-allowed [TFA], signaling-route-set-test prohibited [RSP], and signaling-route-set-test restricted [RSR] messages. It should be noted that even if a destination is provisioned as a cluster, the node appropriately responds to member network management messages (i.e. TFx and RSx messages) as described by the present invention, and if a destination is provisioned as a member, the node appropriately responds to cluster network management messages (i.e. TCx and RCx messages) as described by the present invention.

Cluster routing and management diversity according to the present invention contemplates provisioning both cluster and member routes in an SP, so that the SP can route traffic to a cluster in a particular manner and can send other information, such as the above-noted messages, to those network nodes which might be sending information to it. For example, assume STP 42 of FIG. 3 receives information (data, messages, and the like) destined for a cluster (cluster 40) from STP 50. Cluster routing and management diversity gives STP 42 special capabilities for routing that information to the cluster, even in the presence of the E-linkset extending between the STP and member A of cluster 40.

Member route-sets and cluster route-sets are considered associated if they are administered at a node, and if the PCs of the destinations are identical in the Network ID and Network Cluster fields. This concept is in contrast to the assumption that only cluster or member routes could be provisioned at a node for a given cluster, but not both. More specifically, according to the present invention, it is assumed that one cluster route-set can be provisioned at a node for a cluster and one member route-set can be provisioned at a node for any cluster member, and when determining a route over which an MSU should be sent, the SP either consults a member route-set (if one is provisioned for the DPC in the message) or the cluster route set (e.g. if no member route-set is provisioned).

An STP should be able to broadcast TFx and TCx messages to all adjacent nodes, even if the only available route to the adjacent node is non-direct. An STP or any other SP should also maintain two statuses for each route. First, information should be maintained regarding whether the linkset in the route is "available" or "unavailable". Second, information should be maintained regarding the routing status for each node or cluster accessible via that route (i.e. for each PC or cluster, which TFx or TCx message was last received). These two statuses are independent from one another, and are described in greater detail hereinbelow.

A cluster route-set may only be provisioned if all members that rely on the use of the route-set share the same routing from the SP. That is, the normal route and all alternate routes are the same for each member of the cluster that does not have a member route-set provisioned. This typically occurs when a node is not directly connected to a member, such as when an STP must route all messages toward a cluster through another STP. A member route-set is provisioned if a member can be reached via at least one route that is different from the other members of the cluster. This typically occurs when the node is directly connected to the member, such as when an STP has an A-linkset or an E-linkset connected to a member.

Referring now to FIG. 2, there is illustrated a model network configuration shown generally by reference numeral 30, including two types of clusters, local (cluster 32) and remote (cluster 34). Cluster 32 (consisting of members A, B and C) is a local cluster to local STP (LSTP) or node 36. All of the cluster members are directly adjacent to STP 36 and no intermediate STPs are required (under non-failure conditions) to route to those particular PCs. Consequently, each member of a local cluster requires a different route-set, so a member route-set is provisioned for each member. For example, STP 36's routing table for member A might show LS1 as the normal route, whereas for member B, LS2 would be the normal route.

With continuing reference to FIG. 2, cluster 34 (consisting of members X, Y and Z) is a remote cluster with respect to STP 36, since none of the cluster members are adjacent to STP 36. In this situation, STP 36 must use another mated pair of STPs as intermediate nodes when routing messages to any nodes within cluster 34. This scenario illustrates that it is sufficient to provision only one cluster route-set in an STP for a remote cluster, since the routing is identical for each member. In this case, the route-set provisioned in STP 36 for cluster 34 would most likely show LS4 and LS5 as the normal routes, and the C-linkset as the alternate.

Cluster routing, then, is most appropriate for remote clusters. However, the fact that cluster routing is appropriate for remote clusters does not mean that it must be used for remote clusters. It is acceptable, in the provisioning process, for a remote cluster to be administered with full point code (i.e. member) routing. In that case, it is still necessary for the SP to understand and appropriately act on received cluster network management messages (i.e. TCx messages) pertaining to theft cluster, just as it is necessary for the SP to understand and appropriately act on member network management messages (i.e. TFx messages) that affect SPs administered on a cluster basis.

One consequence of the previous model of cluster routing and management was that if E-linksets were deployed from an STP to a member of a remote cluster, then the STP had to perform member routing for every member of the cluster, even if the E-linkset was only deployed to a single cluster member. This consequence was due to the fact that if an E-linkset was deployed to a member of a remote cluster, the STP had direct connectivity to that cluster. The present invention provides improvements to cluster routing and management, so as to allow E-linksets to be deployed from an STP to a remote cluster while allowing cluster routing to be provisioned in that STP for those cluster members that are not connected via E-linksets.

Figure 3:
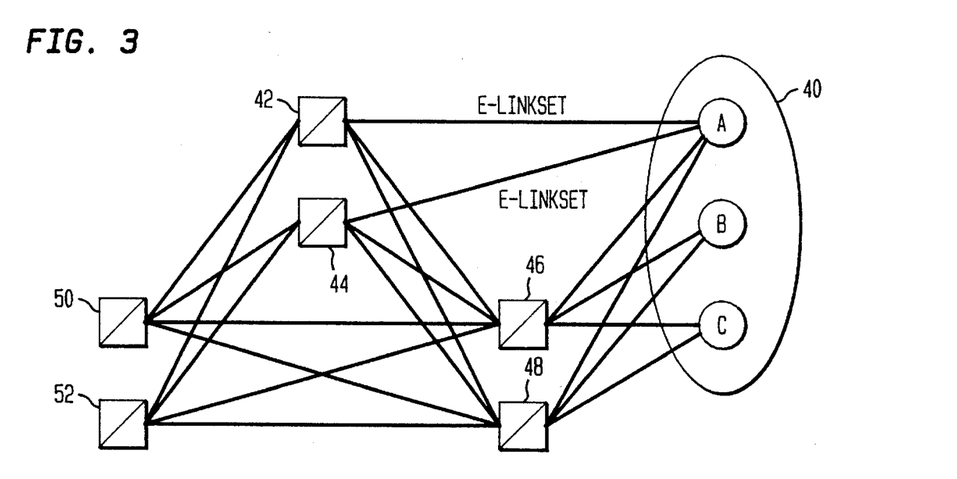
FIG. 3 is an illustration of a communications network architecture including a plurality of STP mated pairs interconnected by bridge links (B-links), and a plurality of cluster members, including member A which is connected to STPs 42 and 44 by E-links.

Referring now to FIG. 3, there is illustrated a communications network architecture including a plurality of STP mated pairs interconnected by B-linksets and a plurality of cluster members, including one connected to STPs 42 and 44 by an E-linkset. It should be noted that in FIG. 3, STPs 42 and 44, which are connected as a mated pair, support cluster routing diversity, and are administered to use the present invention in routing messages toward cluster 40. As is known, communication "links" or "linksets" interconnect the STPs and the cluster. A-linksets generally extend between members of the cluster, such as member A, and STPs, such as STPs 46 and 48. B-linksets or D-linksets generally extend between mated pairs of STPs. For example, in FIG. 3, B-linksets connect STPs 42-44 and STPs 46-48, STPs 42-44 and STPs 50-52, and STPs 46-48 and STPs 50-52. Cross linksets (C-linksets) are those linksets that extend between the individual STPs of a mateo pair (e.g. a C-linkset connects STP 42 to STP 44). E-linksets extend between a cluster and a remote STP that is not otherwise in direct communication with a cluster through an A-linkset. A "linkset", as is known, is a collection of "links" connecting two nodes. As such, although the drawing figures are discussed herein with reference to linksets, it should be noted that the present invention is equally applicable to network configurations which utilize links, or linksets containing only one link.

The present invention contemplates a procedure for a particular class of failure conditions, wherein one or more linksets extending between STPs, such as a B-links, fails but, at least one direct link, such as an E-linkset to a member of the cluster is still available to carry messages or information to the member(s) of the cluster. The procedure includes sending an appropriate network management message(s) from the remote STP, to which the direct link extends, to nodes adjacent to the remote STP, which send information directed for the cluster, to the remote STP. The remainder of this discussion presents a plurality of embodiments for carrying out the procedure.

In one embodiment, an exception list (x-list) is currently defined in the cluster routing and management requirements to list members of a cluster with a more restrictive status than the cluster; this could be extended to also list members with a less restrictive status. With reference to FIG. 3, if the B-linkset extending between the STP 42-44 mated pair and the STP 46-48 mated pair fails, STPs 42 and 44 would broadcast a TCP message for cluster 40 to the STP 50-52 mated pair, followed by a TFA message for member "A", provided that the E-linkset to member "A" from STP 42 was still available. On first consideration, this option seems to be very reasonable. However, there are several problems which make it unworkable.

The first problem is that it is inconsistent with the ANSI standard, which defines the status of a cluster to be the status of the least restrictive (i.e. most permissive) member of the cluster. As an example, given that member "A" of cluster 40 would be allowed from STP 42 (via the E-linkset), sending a TCP message from STP 42 is conveying incorrect information to adjacent nodes, since cluster 40 would not be prohibited from STP 42. Even if the standards were changed to redefine cluster status, a more significant problem exists which makes this option a poor choice.

The second problem is that this embodiment is not backward compatible with the current cluster routing requirements. Suppose that the STP 50-52 mated pair had the current cluster routing and management requirements implemented and administered for cluster 40. Those requirements state that a TFA message received for a cluster with a TCP condition should be ignored. Because of that, if STP 50-52 receives a TFA message after receiving a TCP message, no action would be taken, so the cluster would remain prohibited, and traffic to member "A" routed through STP 50 or 52 would be lost.

In a second embodiment, rather than maintain an x-list of more permissive members, an STP receiving a TFA message for a cluster with a TCP condition would mark the cluster allowed. If this implementation were deployed at the STP 50-52 mated pair, then an unstable condition would result if STP 42-44 transmitted a TCP followed by a TFA, for the following reason. First, receipt of the TCP causes the cluster to be marked "prohibited". Subsequent receipt of the TFA causes the cluster to be marked allowed, at which time traffic would be initiated to the cluster. Upon receipt of this traffic, the STP 42-44 mated pair would send a TCP message in response mode, followed by a TFA message, at which time the cycle repeats itself. In either implementation, the result is unsatisfactory, so this embodiment is not the preferred embodiment.

With the third embodiment, it is not externally visible whether an STP is doing full point code routing to each member of a cluster, or cluster routing and management diversity to the cluster. Using FIG. 3 as an illustration, when the B-linksets extending between the STP 42-44 mated pair and the STP 46-48 mated pair fail, STPs 42 and 44 would broadcast a TFP message for each member of cluster 40 that is inaccessible via E-linksets (i.e. members "B" and "C"). The primary disadvantage with this approach is that STPs 42 and 44 do not know how many populated members exist for cluster 40, except for the ones connected via E-linksets. The STPs 42 and 44, therefore, must assume that all 256 possible members exist, and they must broadcast, to each adjacent node, a TFP message for each of the 256 members not directly connected via E-links. This is wasteful of STP resources, both in broadcasting so many TFP messages, and in processing the resulting RSP messages.

In addition, the third embodiment would likely cause ghost members to appear on adjacent SP's x-lists (e.g. the STP 50-52 mated pair). These ghost members would remain on the x-lists, until they were either manually or automatically removed. However, until they were removed, the STP 50-52 mated pair would continue to send signaling-route-set-test-prohibited (RSP) messages, which is wasteful of resources at all STPs involved. Accordingly, this embodiment is not the preferred embodiment.

The fourth possible embodiment is similar to the third embodiment, except that it introduces the concept of a populated member list, which lists all populated cluster members not connected via E-links. This list resides at each STP and is consulted when the STP determines that it must broadcast TFP or TFR messages to adjacent nodes. Referring once again to FIG. 3, this list would reside in STPs 42 and 44, and would contain the point codes of all members of cluster 40 not connected via E-links. Thus, STP 42's list would include the point codes for members "B" and "C" as would STP 44's list. While this solves one of the problems with the third embodiment, it adds complexity to the administration of the routing tables at STPs 42 and 44, thus reducing one of the major advantages of performing cluster routing in the first place: ease of administration. Furthermore, human error might cause this additional table to be improperly administered. This could cause TFPs to be sent (or not to be sent) for inappropriate cluster members. The response mode TFP requirements and the route-set test procedures would correct any problems resulting from such an error. However, because the populated member list would add a great deal of complexity to the administration process, this embodiment is not the preferred embodiment.

As a fifth embodiment, a fundamentally different and new type of message (or class of messages) is defined, in standards, that supports the cluster routing and management diversity feature and any other kind of routing schemes developed in the future. This message provides a means for an STP (e.g. STP 42 in FIG. 3) to convey, in a single message to other nodes, the status of a group of members of a cluster, even if individual members in the group have a status different from other members of the group. The one of the nodes receiving the message from the STP then originates a single inquiry message regarding the status of the members of the cluster to the STP. This is advantageous in that it eliminates the problem of the standards, in the existing message set, not effectively supporting the use of E-links and cluster routing together.

A sixth possible embodiment is to maintain the requirements in their current form: disallow an SP from performing cluster routing and management diversity to any cluster to which it has direct connectivity. In light of the complicated requirements that result from the other options, this embodiment has advantages. However, if implemented improperly, incompatibility with current cluster routing and management requirements could result. Network problems could arise if one company's product is deployed and connected to another company's products which support a different model of cluster routing and management, threatening network integrity in times of failure. For these reasons, this embodiment is not the preferred embodiment.

The preferred embodiment relies on response mode TFPs and TFRs to inform adjacent nodes of the status of cluster members, when failure scenarios occur that do not affect every cluster member. For example, in FIG. 3, if the B-linksets extending from the STP 42-44 mated pair to the STP 46-48 mated pair fail and the E-linkset to member "A" remains functional, STPs 42 and 44 would not automatically broadcast any TCPs or TFPs, but instead would send TFPs for individual members in response to traffic destined for the affected members. When only the B-linksets extending from STP 42 to STPs 46 and 48 fail, STP 42 informs adjacent nodes of the status of individual members utilizing a response mode TFR procedure, rather than broadcasting TCR or TFR messages. The STP immediately sends a TFR message, once per link or linkset (as a supplier option), in response to the next message received on that link or linkset for the restricted destination. This method does not convey the change in cluster or member status to adjacent nodes as quickly as the first five embodiments described above and, in fact, it is possible that a small number of messages destined to a prohibited destination could get lost. However, once the information is conveyed (i.e. once the response mode TFRs and TFPs are sent), the subsequent actions at the adjacent nodes default to what is already in place. Thus, from an overall network perspective, this embodiment is preferable to the others, and is described in greater detail hereinbelow.

In the preferred embodiment, route-set prioritization as described below is proposed for all SPs that implement cluster routing diversity, as described below. FIG. 3 and Table I shown below are used to illustrate the individual requirements for prioritization.

TABLE I

| Partial MTP Routing Table At STP 42 | | | |
| --- | --- | --- | --- |
| Destination | Route | Cost | Status |
| Member A | 42-A | 5 | Allowed |
| Cluster 40 | 42-46 | 10 | Allowed |
|  | 42-48 | 10 | Allowed |
|  | 42-44 | 20 | Allowed |

In FIG. 3, STPs 42 and 44 have the cluster routing diversity feature deployed and administered for cluster 40. In the preferred embodiment, a member route-set takes precedence over a cluster route-set and is consulted first in making a routing decision. A cluster and member route-set are considered associated route-sets if the Network ID and Network Cluster ID fields of the member PC are the same as those fields in the cluster PC.

Preferably, an SP allows both full point code (i.e. member routing) and partial point code (i.e. cluster routing) route-set entries for the same cluster. While a member route-set may exist for each member of a cluster, only one cluster route-set may exist for the cluster. This permits the SP to contain the routing table structure illustrated in the above table, in which a member entry for member "A" exists, as well as a cluster entry for cluster "40".

According to the present invention, an SP first utilizes a member route-set, if it exists, to determine an outgoing route over which to send a message. Thus, if STP 42 in FIG. 3 needs to send a message to member "A", STP 42 first consults the route-set for member "A" since one exists. If no member route-set exists, STP 42 utilizes the cluster route-set to determine an outgoing route over which to send a message. Thus, if STP 42 in FIG. 3 needs to send a message to member "B", the STP should consult the route-set for cluster "40", since no member route-set entry exists for member "B".

If a member route-set indicates that a member is inaccessible (i.e. if each route in the member route-set is prohibited or unavailable), the SP consults the cluster route-set to determine if additional routes may be used to reach that member. For example, as shown in Table I, if the member route toward member "A" was marked prohibited, the STP consults the cluster route-set, to see if routes are listed in the cluster route-set that are not administered in the member route-set. The example given shows that the B-linksets and C-linkset would be accessible via the cluster route-set, even though they are not listed in the member route-set.

It should be noted, however, that conditions might exist in which the cluster route-set should not be consulted. For example, although it has been recommended that clusters be homed on a single STP pair, there is no guarantee that this recommendation is followed. Additionally, there could be regulatory constraints that might not allow certain routes to be used for routing certain kinds of traffic toward individual cluster members. For these reasons, it is necessary to define a method whereby the cluster route-set is either consulted or not, if the member route-set shows a member as inaccessible.

Accordingly, in the preferred embodiment, a carrier shall be able to administer, on a per member basis, whether the cluster route-set should be used for route determination, if each route in the member route-set has a TFP condition, or is unavailable. A cluster route-set administered in this way is considered linked to the member route-set.

The preferred embodiment also includes provisions for all SPs that: implement cluster management diversity for responding to signaling route management messages. If these provisions are fulfilled, consistency in route status between cluster and member route-sets is ensured.

Figure 4:
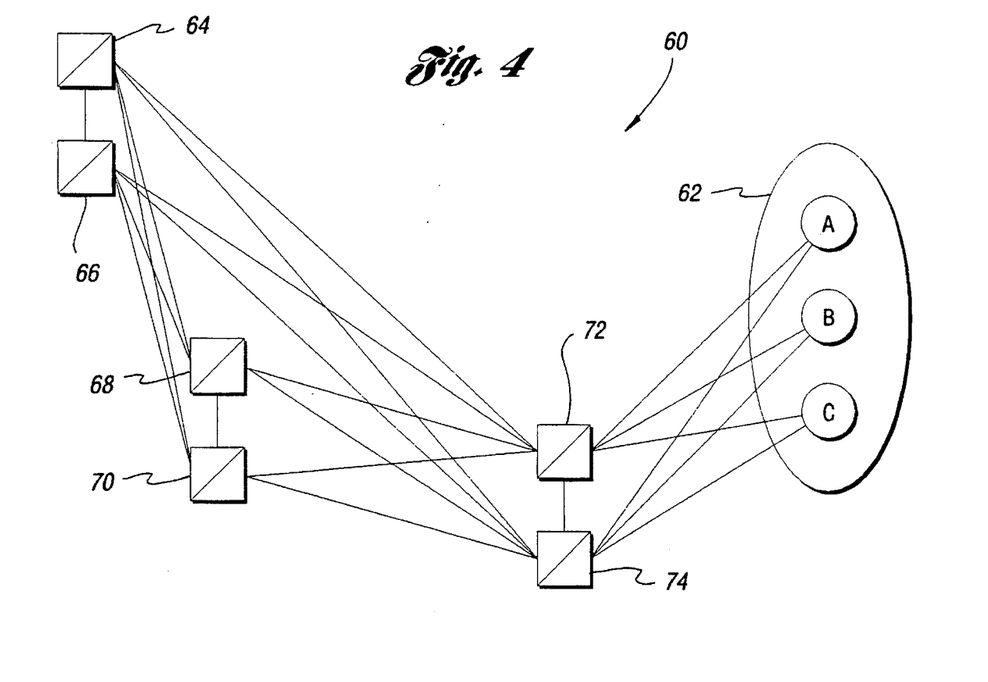
FIG. 4 is an illustration of a communications network including a cluster and a plurality of STPs connected to each other and to the cluster.

Referring now to FIG. 4, the provisions for responding to signaling route management messages will be discussed in greater detail. As shown, the communications network 60 includes a cluster 62 and a plurality of STPs 64-74 connected to each other and to the cluster. When consulting FIG. 4, it should be assumed that, for regulatory reasons, the linksets between the STP 64-66 mated pair and the STP 72-74 mated pair serve as alternate (lower priority) routes only for member "A". One scenario where this might occur is if member "A" is an operator services system (OSS) and member "B" is an access tandem, and both "members" reside at the same switch, but have different point codes within the same cluster. In that case, STP 64 might route a TCAP response for member "A" via STP 68, and ISDN User Part (ISUP) messages for member "B" (and the rest of cluster 62) via STP 72. How the STP 64-66 mated pair reacts in response to signaling route management messages is described immediately below.

In the preferred embodiment, when an SP receives a TCP message for a given route, the SP marks the affected cluster route with a TCP condition. For each associated member route-set, if the affected route is in the route-set, the SP marks the route with a TFP condition. Cluster signaling-route-set-test-prohibited [RCP] procedures are initiated, and forced rerouting is performed for the affected destinations. If, in an associated member route-set, the member is marked with a TFP condition, RSP procedures are subsequently initiated upon receipt of a TCR or TCA message about the cluster.

With continuing reference to FIG. 4, to illustrate the above requirement, assume that STP 68 sends a TCP message regarding cluster 62 to STP 64. In the table below, STP 64 would change the status on cluster route 64-68 from allowed to prohibited, and change the status on member route 64-68 (for member A) from allowed to prohibited. This ensures consistency between the member and cluster routes. When a TCR or TCA message is later received from STP 68, changing the cluster status to restricted or allowed, STP 64 would immediately send an RSP message about member "A" to STP 68. STP 68 would then respond appropriately to the RSP message, updating the status of member "A" at STP 64.

TABLE II

Partial MTP Routing Table At STP 64

| Destination | Route | Cost | Status |
| --- | --- | --- | --- |
| Member A | 64-68 | 5 | Allowed |
| | 64-70 | 5 | Allowed |
| | 64-66 | 10 | Allowed |
| Cluster 62 | 64-72 | 5 | Allowed |
| | 64-74 | 5 | Allowed |
| | 64-66 | 10 | Allowed |
| | 64-68 | 20 | Allowed |
| | 64-70 | 20 | Allowed |

When a TCR message is received for a given route, the SP marks the affected cluster route with a TCR condition. For each associated member route-set, if the affected route is in the route-set, and a TFA condition holds, the SP marks the route with a TFR condition. If a TFP condition holds, it is not changed. Cluster signaling-route-set-test-restricted [RCR] procedures are initiated, and controlled rerouting is performed for the affected destinations. If, in an associated member route-set, the member is marked with a TFR condition, signaling-route-set-test-restricted [RSR] procedures are initiated upon receipt of a TCA message about the cluster.

To illustrate, assume that STP 68 of FIG. 4 sends a TCR message about cluster 62 to STP 64. In Table II above, STP 64 would change the status on cluster route 64-68 from allowed to restricted, and change the status on member route 64-68 from allowed to restricted. If the member route 64-68 has a TFP condition, this is not changed, because receipt of a less restrictive cluster network management message does not affect a more restrictive member. This is analogous to maintaining prohibited members on an x-list when a TCR message is received. When a TCA message is later received from STP 68, changing the cluster status to allowed, STP 64 would immediately send an RSR message about member "A" to STP 68. STP 68 would then respond appropriately to the RSR message, updating the status of member "A" at STP 64.

When a TCA message is received for a given route, the SP marks the affected cluster route with a TCA condition, and controlled rerouting is performed for the affected destinations. It should be noted that this procedure does not affect any member routes. This is analogous to maintaining restricted and prohibited x-list members when a TCA message is received.

When a TFP message about a particular member is received for a given route, if the affected route is in a member route-set, the SP marks the member route with a TFP condition. If a linked cluster route-set exists and the affected route is in the cluster route-set, or if there is no member route-set, then the SP creates an x-list entry for the member, with a TFP condition on the affected route. RSP procedures are initiated, and forced rerouting is performed for the affected destination.

Referring once again to FIG. 4, for illustration purposes assume that STP 68 sends a TFP message about member "A" to STP 64. In Table II above, STP 64 would change the status on member route 64-68 from allowed to prohibited, and make a prohibited entry in an x-list for cluster route 64-68. If the cluster route is not linked to the member route, the latter operation is unnecessary since, in that situation, the cluster route would never be consulted for route determination for member "A". Accordingly, an inconsistency in status with the member route does not create a problem.

In the preferred embodiment, when a TFR message is received for a given route, if the affected route is in a member route-set, the SP marks the route with a TFR condition (if the cluster status is not prohibited on the route). If a linked cluster route-set exists and the affected route is in the cluster route-set (if the cluster status is not prohibited on the route), or if there is no member route-set, then the SP ensures that an entry exists on the cluster's x-list for the member, with a TFR condition on the affected route. RSR procedures are initiated, and controlled rerouting is performed for the affected destination.

With reference to FIG. 4, to illustrate this procedure, assume that STP 68 sends a TFR message about member "A" to STP 64. In Table II above, STP 64 alters the status on member route 64-68 from allowed to restricted, and makes a restricted entry in an x-list for cluster route 64-68. If the cluster route is not linked to the member route, the latter operation is unnecessary since, in that situation, the cluster route would not be consulted for route determination for member "A". Accordingly, an inconsistency in status with the member route is acceptable.

Similarly, when a TFA message is received for a given route, if the affected route is in a member route-set, the SP marks the route with a TFA condition (if the cluster status is allowed on the route). If a linked cluster route-set exists and the affected route is in the cluster route-set (if the cluster status is allowed on the route), or if there is no member route-set, then the SP ensures that no entry exists on the cluster's x-list for the member. Controlled rerouting is performed for the affected destination.

For purposes of illustration of this principle, consider FIG. 4 and assume that STP 68 sends a TFA message about member "A" to STP 64. In Table II above, STP 64 changes the status on member route 64-68 to allowed (if it was not already allowed), and removes any entry for member "A" in the x-list for cluster route 64-68. If the cluster route is not linked to the member route, the latter operation is unnecessary since, in that situation, the cluster route would not be consulted for route determination for member "A". As such, an inconsistency in status with the member route is not a problem.

With the addition of the cluster management diversity feature of the present invention, modifications to the currently understood definitions of member status are necessary. Thus, a member is allowed if any normal route in the member route-set has a TFA condition and is available, or, if no member route-set exists, any available normal route in an associated cluster route-set has a TCA condition, and the member is not on the x-list for that cluster for that route. A member is prohibited if each route in the member route-set has a TFP condition or is unavailable, and each route in a linked cluster route-set has a TCP condition or is unavailable. A member is also prohibited if no member route-set is administered, and it is marked with a TFP condition on the x-list for each available route marked with a TCA or TCR condition in the cluster route-set. A member is also prohibited if a member route-set is not administered and all routes in the cluster route-set are marked with TCP conditions or are unavailable. Members which are neither allowed nor prohibited are restricted.

Furthermore, with the addition of the cluster routing diversity feature of the present invention, modifications to the definitions of cluster status are also necessary. Essentially, the cluster status is the status of the least restrictive cluster member. A cluster is allowed if any normal route in any associated member route-set has a TFA condition and is available, or if any normal route in the cluster route-set has a TCA condition and is available. A cluster is prohibited if each route in all associated member route-sets has a TFP condition or is unavailable, and each route in the cluster route-set has a TCP condition or is unavailable. A cluster is restricted if it is not prohibited or allowed.

Some modifications to early requirements for telecommunications equipment vendors for sending signaling route network management messages were required. An STP originates a TCP message to appropriate adjacent nodes as a broadcast message when a cluster first becomes prohibited at the STP; in response to a received message destined to a member of a prohibited cluster; or in response to a received RCR message, when the affected cluster is prohibited. It should be noted that this is not an exhaustive list of conditions under which these messages may be sent. To illustrate an applicable scenario, in which this requirement would apply, consider FIG. 3. Cluster 40 would be considered prohibited from STP 42 when the E-linkset to member "A", the combined B-linkset to STPs 46 and 48, and the C-linkset to STP 44 were all unavailable.

An STP originates a TCR message to appropriate adjacent nodes as a broadcast message when a cluster first becomes restricted at the STP, or in response to a received RCP message, when the affected cluster is restricted. When a cluster first becomes restricted at the STP, any running transfer-prohibited inhibited timers for any cluster members shall be canceled, so that the response mode TFP procedures are active, immediately after broadcasting the TCR message. To illustrate an applicable scenario, consider FIG. 3, wherein cluster 40 is considered restricted from STP 42 when the E-linkset to member "A" and the combined B-linkset to STPs 46 and 48 are both unavailable. Note that, as a consequence of the definition of cluster status, TCR and TCP messages will never be broadcast if any E-linkset to any cluster member is available.

In the preferred embodiment, an STP originates a TCA message to appropriate adjacent nodes as a broadcast message when a cluster status changes to allowed at the STP, or in response to a received RCR or RCP message, when the affected cluster is allowed. Any running transfer-prohibited inhibited or transfer-restricted response mode timers for any cluster members are canceled when a cluster status changes to allowed at the STP, so that the response mode TFP and TFR procedures are active, immediately after the broadcast of the TCA messages. Referring once again to FIG. 3, cluster 40 would be considered allowed from STP 42 if the E-linkset to member "A" was available, or either leg of the combined B-linkset to STPs 46 and 48 was available and allowed.

An STP originates a TFP message to appropriate adjacent nodes as a broadcast message when an individual member first becomes prohibited at the STP; in response to a received message destined to a prohibited member, if the cluster is not prohibited; or in response to a received RSR test message, if the affected member is prohibited. Of course, other scenarios might arise in which an STP would originate a TFP message. As an example of this, consider FIG. 3, in which member "A" is considered prohibited from STP 42 if the E-linkset to member "A" was unavailable, and it was marked prohibited on the x-lists for cluster 40 through routes 42-46, 42-48, and 42-44.

According to the present invention, an STP originates a TFR message to appropriate adjacent nodes as a broadcast message when an individual member first becomes restricted at the STP; in response to the first received message destined to a restricted member, once per link or linkset; or in response to a received RSP message, if the affected member is restricted. Considering FIG. 3, member "A" would be considered restricted from STP 42 if the E-linkset to member "A" was unavailable, and it was marked allowed through routes 42-46, 42-48, or 42-44. It should be noted that the response-mode TFR message described above, which only applies when the cluster routing and management diversity feature is administered for a cluster, does not rely on the expiration of a timer.

An STP originates a TFA message to appropriate adjacent nodes as a broadcast message when an individual member first becomes allowed at the STP, unless the fact that the member became allowed changed the cluster status to allowed; or in response to a received RSR or RSP message, if the affected member is allowed. Referring to FIG. 3, member "A" would be considered allowed from STP 42 if the E-linkset to member "A" was available.

Cluster routing and management diversity according to the present invention and described above provides for cluster routing and management without the constraint that the same routing be used for all members of a cluster. This is appropriate at an STP where E-linksets are being deployed, or at an SPCS where F-linksets are being deployed, but other scenarios where this would apply are certainly conceivable. The advantages include a reduction in the size of the MTP routing table, so that less (memory) resources are needed in an SP, and an ease in the administration of the MTP routing table. Additionally, less signaling route network management messages are exchanged, in the case when a cluster becomes prohibited from an STP.

This feature is beyond that which industry standards originally anticipated in terms of routing in an SS7 network. As a result, requirements are quite complex. The many options discussed herein for supporting cluster routing and management diversity (including one which does not support the feature) point out that no solution is without tradeoffs. The preferred embodiment provides the best tradeoff between the desired functionality and the goal of minimizing feature complexity, conditioned by the fact that the proposed requirements only apply when a node is administered with both cluster and full point code entries to members of the same cluster.

Figure 5:
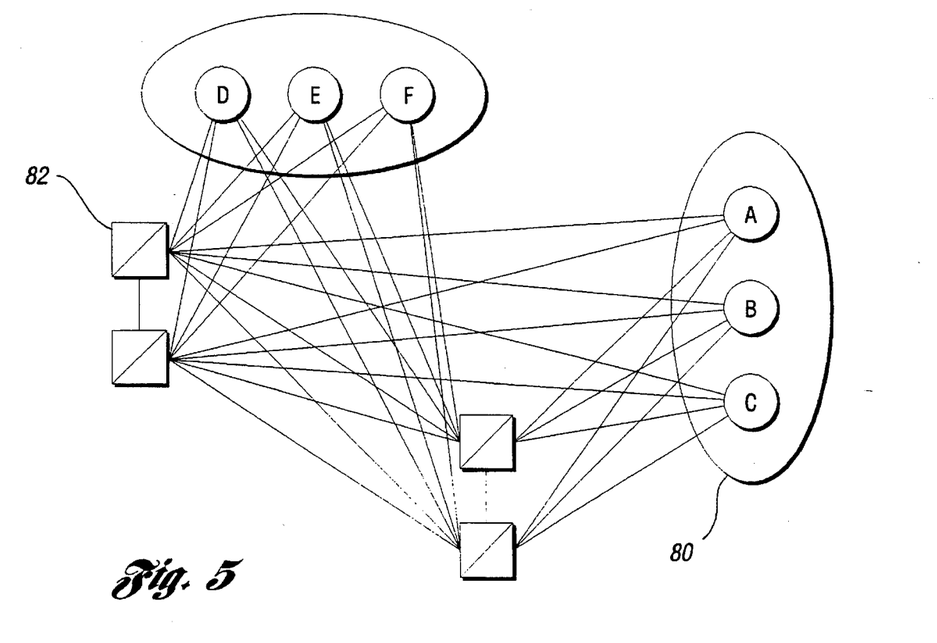
FIG. 5 is an illustration of a fully-sectorized LATA and full E-linkset deployment, for use with the present invention.

There are at least two scenarios which illustrate how these advantages are realized. One scenario involves a configuration involving a fully sectorized LATA and full E-linkset deployment, as illustrated in FIG. 5. In this configuration, the benefits of employing cluster routing and management diversity at STP 82 are at least threefold. First, a reduced-size message transfer part [MTP] routing table (shown below) can be realized. This is possible because routes common to all SPs could be administered in a single cluster route-set, instead of being included in each full point code route-set. In this example, the number of administered routes at STP 82 would be reduced from twelve (12) without the present invention to six (6) with the present invention.

| Reduced-Size MTP Routing Table At STP 82 | | | |
|---|---|---|---|
| Destination | Route | Cost | Status |
| Member A | 82-A | 5 | Allowed |
| Member B | 82-B | 5 | Allowed |
| Member C | 82-C | 5 | Allowed |
| Cluster 80 | 82-84 | 10 | Allowed |
|  | 82-86 | 10 | Allowed |
|  | 82-88 | 20 | Allowed |

Figure 6:
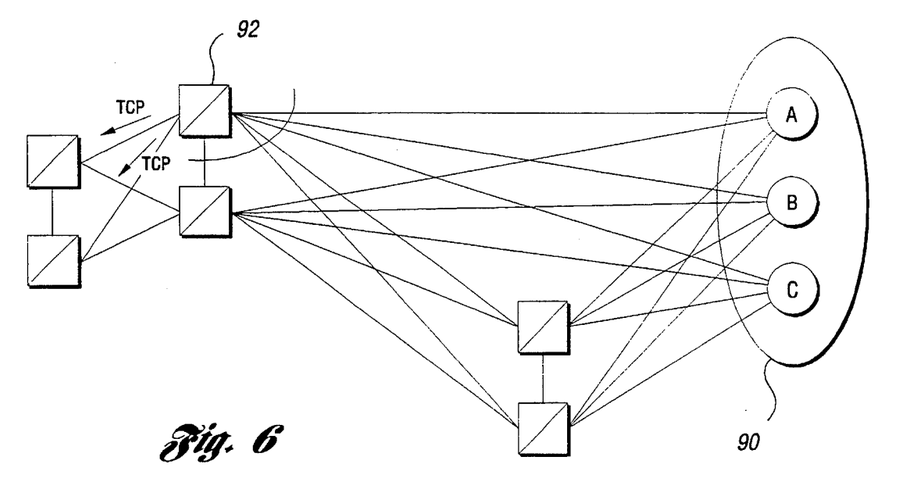
FIG. 6 is an illustration of TCP message transmission for use with the present invention.

Second, an STP would be able to originate TCx messages under certain conditions, rather than TFx messages, reducing the volume of network management traffic when certain failures occur. FIG. 6 illustrates where this situation would apply. As shown, if STP 92 could not access cluster 90, STP 92 would broadcast TCP messages about cluster 90, rather than TFP messages for each member of the cluster, thereby reducing the amount of network management traffic. Lastly, the administration of the routing table at an STP (e.g. STP 82 in FIG. 5) would be simplified, because all common routes are contained in only one route-set, so they do not need to be changed if new members are added to cluster 80.

Figure 7:
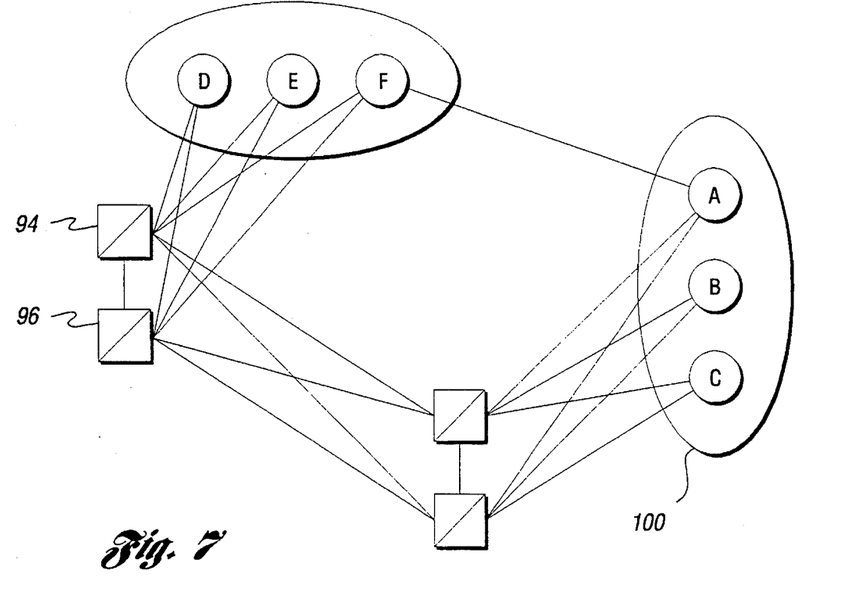
FIG. 7 is an illustration of the deployment of F-linksets at SPCSSs.

A second scenario involves a configuration that includes F-linksets, which extend between clusters, as illustrated in FIG. 7. In FIG. 7, an F-linkset extends from end node "F" to cluster 100. The benefits of incorporating cluster routing and management diversity in this scenario are at least twofold. First, the size of the MTP routing table at SPCS "F" would be reduced, as shown below, since common routes to cluster 100 are administered in a single cluster route-set, rather than in each member's route-set. In this example, this would reduce the number of administered routes at SPCS "F" from seven (7) without the feature to three (3). Second, the administration of the routing table at switch "F" would be simplified, because all common routes are contained in only one route-set, so they do not need to be changed, if new members are added to cluster 100.

| Reduced-Size MTP Routing Table At Switch "F" | | | |
|---|---|---|---|
| Destination | Route | Cost | Status |
| Member A | F-A | 5 | Allowed |
| Cluster 100 | F-94 | 10 | Allowed |
|  | F-96 | 10 | Allowed |

It is understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

What is claimed is:

1. A method for routing messages through a communication system to an end member in a cluster of members from a remote node through a pair of intermediate nodes, wherein one of said members in said cluster can be reached from said remote node by a direct link utilizing member routing or by intermediate links through at least one other of said intermediate nodes utilizing cluster routing, the method comprising maintaining at said remote node a first routing table including cluster routing entries identifying cluster routes for said cluster including said end member, maintaining at said remote node a second routing table including member routing entries identifying member routes for the members of said cluster, said first and second tables being associated with each other, receiving at said remote node a cluster network management message including status; information as to the status of said cluster and identifying cluster routes affected by the message, marking the cluster routing entries in said first routing table associated with the affected cluster routes with said status information, marking the associated member routing entries with said status information, so as to ensure consistency of route status information between the cluster and the member routing entries, and sending messages from said remote node to said end member through said direct link utilizing member routing entries in said second routing table and from said remote node to other end members in said cluster through said intermediate links utilizing cluster routing entries in said first routing table.

2. The method in accordance with claim 1 wherein said communication system is a signaling system and said intermediate nodes are signaling transfer points.

3. The method of claim 2 wherein said remote node first consults said second routing table to determine the availability of a member route to said end member and then, if no member route is provisioned, consults said first routing table to utilize a cluster route set to determine the availability of a cluster route through intermediate links.

4. The method of claim 2 wherein said remote node also maintains an x-list for the cluster route, said method further comprising the steps of receiving at said remote node a network management message relating to the status of a member of said cluster, and marking the member routing entries in said second routing table with said member status information.

5. The method of claim 2 wherein said first and second tables are linked together and wherein said remote node also maintains an x-list for the cluster route, said method further comprising the steps of receiving at said remote node a network management message relating to the status of a member of said cluster, marking the member routing entries in said second routing table with said member status information, and modifying the x-list for the cluster route to reflect the status of said member of said cluster, so as to ensure consistency in route status between said x-list and said second routing table.

6. The method in accordance with claim 1 wherein said first and second tables are linked together, said method further comprising the step of utilizing cluster routing entries in said first routing table to send messages to said cluster via a cluster routing entry if each member route to said cluster in said second table is prohibited or unavailable.

* * * * *